(12) United States Patent
Ogawa et al.

(10) Patent No.: US 9,250,476 B2
(45) Date of Patent: *Feb. 2, 2016

(54) LIQUID CRYSTAL DISPLAY DEVICE AND METHOD FOR PRODUCING THE SAME

(75) Inventors: Shinji Ogawa, Kitaadachi-gun (JP); Yoshinori Iwashita, Kitaadachi-gun (JP); Takeshi Kuriyama, Kitaadachi-gun (JP)

(73) Assignee: DIC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/115,204

(22) PCT Filed: Sep. 5, 2012

(86) PCT No.: PCT/JP2012/072608
§ 371 (c)(1),
(2), (4) Date: Dec. 30, 2013

(87) PCT Pub. No.: WO2013/145370
PCT Pub. Date: Oct. 3, 2013

(65) Prior Publication Data
US 2015/0029452 A1    Jan. 29, 2015

(30) Foreign Application Priority Data

Mar. 30, 2012  (JP) ................. 2012-083071

(51) Int. Cl.
*G02F 1/1333*    (2006.01)
*G02F 1/1337*    (2006.01)
(Continued)

(52) U.S. Cl.
CPC .......... *G02F 1/1337* (2013.01); *C09K 19/3003* (2013.01); *C09K 19/56* (2013.01);
(Continued)

(58) Field of Classification Search
CPC ............... C09K 19/56; C09K 19/3003; C09K 2019/301; C09K 2019/3004; C09K 2019/3009; C09K 2019/3016; G02F 1/1337; G02F 1/133788

USPC ........ 428/1.1, 1.2; 349/123, 182; 252/299.01, 252/299.6, 299.63
See application file for complete search history.

(56) References Cited

U.S. PATENT DOCUMENTS 8,900,479 B2 * 12/2014 Furusato et al. ......... 252/299.62
2006/0250556 A1  11/2006 Kataoka et al.
(Continued)

FOREIGN PATENT DOCUMENTS

JP    06-235925 A    8/1994
JP    2002-357830 A   12/2002
(Continued)

OTHER PUBLICATIONS

Internatioal Search Report for PCT/JP2012/072608, Mailing Date of Oct. 23, 2012.
(Continued)

*Primary Examiner* — Geraldina Visconti
(74) *Attorney, Agent, or Firm* — Westerman, Hattori, Daniels & Adrian, LLP

(57) ABSTRACT

Provided are a liquid crystal display device that suppresses occurrence of drop marks during production without degrading various properties, such as dielectric anisotropy, viscosity, nematic phase upper limit temperature, rotational viscosity ($\gamma_1$), and ghosting property, and a method for producing the liquid crystal display device.

A liquid crystal display device 10 of the present invention includes a liquid crystal composition layer 13 sandwiched between a first substrate 11 and a second substrate 12 and vertical alignment films 16 and 17 formed of a cured product of a polymerizable liquid crystal compound. The liquid crystal composition constituting the liquid crystal composition layer 13 contains compounds represented by general formulae (I) and (II).

9 Claims, 1 Drawing Sheet

(51) Int. Cl.
   *C09K 19/30* (2006.01)
   *C09K 19/56* (2006.01)
(52) U.S. Cl.
   CPC .... *G02F1/133788* (2013.01); *C09K 2019/301* (2013.01); *C09K 2019/3004* (2013.01); *C09K 2019/3009* (2013.01); *C09K 2019/3016* (2013.01)

(56) References Cited

U.S. PATENT DOCUMENTS

2015/0022750 A1* 1/2015 Ogawa et al. .................. 349/43
2015/0029451 A1* 1/2015 Ogawa et al. ................ 349/123

FOREIGN PATENT DOCUMENTS

| JP | 2006-058755 A | 3/2006 |
| JP | 2006-139046 A | 6/2006 |
| JP | 2009-139455 A | 6/2009 |
| JP | 2010-032860 A | 2/2010 |
| JP | 2011-065177 A | 3/2011 |
| JP | 2011-095697 A | 5/2011 |
| JP | 2012-058266 A | 3/2012 |
| WO | 2011/092973 A1 | 8/2011 |

OTHER PUBLICATIONS

Decision to Grant a Patent for JP 2013-511191, Maling Date of Jul. 2, 2013.

* cited by examiner

LIQUID CRYSTAL DISPLAY DEVICE AND METHOD FOR PRODUCING THE SAME

TECHNICAL FIELD

The present invention relates to a liquid crystal display device useful as a constitutional member of a liquid crystal television or the like and a method for producing the liquid crystal display device.

BACKGROUND ART

Liquid crystal display devices are used in watches, calculators, various measuring instruments, automobile panels, word processors, electronic notepads, printers, computers, televisions, clocks, advertising boards, etc. Representative examples of the types of liquid crystal displays are a twisted nematic (TN) type, a super twisted nematic (STN) type, a vertical alignment (VA) type that uses thin film transistors (TFTs), and an in-plane switching (IPS) type. The liquid crystal compositions used in these liquid crystal display devices are required to be stable against outer factors such as moisture, air, heat, and light, stay in a liquid crystal phase in a temperature range as wide as possible about room temperature, exhibit a low viscosity, and operate at low driving voltage. A liquid crystal composition is constituted by several to several tens of compounds in order to optimize the dielectric anisotropy ($\Delta\epsilon$), refractive index anisotropy ($\Delta n$), etc., for individual liquid crystal display devices.

In VA-type displays that are widely used in liquid crystal televisions and the like, a liquid crystal composition having a negative $\Delta\epsilon$ is used. Meanwhile, for all drive types, low-voltage driving, high-speed response, and a wide operation temperature range are desired. In other words, the absolute value of $\Delta\epsilon$ is required to be high, the viscosity ($\eta$) is required to be low, and the nematic phase-isotropic liquid phase transition temperature ($T_{ni}$) is required to be high. Also, there is need to adjust $\Delta n$ of the liquid crystal composition to be in an appropriate range that suits the cell gap since the product $\Delta n \times d$ of $\Delta n$ and a cell gap (d) is set. Moreover, high-speed response is important for liquid crystal display devices applied to televisions and the like and thus a liquid crystal composition having a low rotational viscosity ($\gamma_1$) is desired.

Multi-domain vertical alignment (MVA)-type liquid crystal display devices which are a type of VA displays with improved viewing angle characteristics are now widely used. In this liquid crystal display device, projecting structures are formed on a substrate to divide a pixel so that the liquid crystal molecules are aligned in plural directions. A MVA liquid crystal display device is advantageous in terms of viewing angle characteristics but has a problem in that liquid crystal molecules respond at different speeds between the portion near the projecting structure on the substrate and the portion remote from the projecting structure and thus the overall response speed has been insufficient due to the liquid crystal molecules that are remote from the projecting structure and slow in response. There has also been degradation of transmittance caused by the projecting structure. In order to address these issues, polymer sustained alignment (PSA) liquid crystal display devices (an example of which is a polymer stabilized (PS) liquid crystal display device) have been developed to provide uniform pretilt angles within each domain of a pixel without forming non-transmitting projecting structures in a cell, which is different from a typical MVA liquid crystal display device. A PSA liquid crystal display device is produced by adding a small amount of a reactive monomer to a liquid crystal composition, introducing the liquid crystal composition to a liquid crystal cell, and polymerizing the reactive monomer in the liquid crystal composition by irradiation with an active energy ray. Accordingly, appropriate pretilt angles can be provided in the divided pixel, and, as a result, improved contrast brought about by improved transmittance and a high-speed responsiveness caused by a uniform pretilt angle can be achieved (for example, refer to PTL 1). However, in a PSA liquid crystal display device, a reactive monomer must be added to a liquid crystal composition and this has caused many problems in active-matrix liquid crystal display devices that require a high voltage holding capacity. There has been another problem of display failure such as ghosting.

A method with which the drawbacks of the PSA liquid crystal display devices can be overcome and a uniform pretilt angle is provided to liquid crystal molecules without contamination by foreign matter other than the liquid crystal materials in the liquid crystal composition has been developed. According to this method, a polymerizable liquid crystal that exhibits reactivity when irradiated with ultraviolet light is used instead of conventional alignment film materials such as polyimide (for example, refer to PTL 2 and PTL 3).

As the size of the screen of liquid crystal display devices becomes larger, the method for producing liquid crystal display devices has undergone significant changes. That is, since the conventional vacuum injection method requires a long time to produce large-size panels, a one-drop-fill (ODF)-type production method has become the mainstream technology for producing large panels (for example, refer to PTL 5). Because this method involves a shorter injection time compared to the vacuum injection method, it has become the mainstream method for liquid crystal display device production. However, drop marks formed by dropping the liquid crystal composition remain in the liquid crystal display device while retaining their shapes even after fabrication of the liquid crystal display device. It should be noted that the drop marks are defined as a phenomenon that the trace left by dropping the liquid crystal composition appears as white marks in black display. In particular, when the aforementioned method that uses polymerizable liquid crystals is employed, small quantities of unreacted polymerizable liquid crystals possibly remain and thus the problem of drop marks occurs easily. In general, the occurrence of drop marks frequently depends on the choice of the liquid crystal material and the exact cause thereof is not clear.

A method for suppressing the occurrence of drop marks has been disclosed in which a polymerizable compound mixed into a liquid crystal composition is polymerized to form a polymer layer in the liquid crystal composition layer, thereby suppressing the occurrence of drop marks in relation to an alignment control film (for example, refer to PTL 5). However, this method has a drawback in that ghosting occurs due to the reactive monomer added to the liquid crystal composition and that the effect of suppressing drop marks is insufficient as with the PSA method and the like. Thus development of a liquid crystal display device with which ghosting and drop marks are less likely to occur while maintaining basic characteristics needed for liquid crystal display devices has been desired.

CITATION LIST

Patent Literature

PTL 1: Japanese Unexamined Patent Application Publication No. 2002-357830

PTL 2: Japanese Unexamined Patent Application Publication No. 2009-139455
PTL 3: Japanese Unexamined Patent Application Publication No. 2010-32860
PTL 4: Japanese Unexamined Patent Application Publication No. 6-235925
PTL 5: Japanese Unexamined Patent Application Publication No. 2006-58755

SUMMARY OF INVENTION

Technical Problem

The present invention has been made under the above-described circumstances. An object of the invention is to provide a liquid crystal display device that suppresses occurrence of drop marks during production without degrading various properties, such as dielectric anisotropy, viscosity, nematic phase upper limit temperature, rotational viscosity ($\gamma_1$), and ghosting property, and a method for producing the liquid crystal display device.

Solution to Problem

To address these challenges, the inventors of the present invention have investigated on various combinations of liquid crystal compositions and method for providing pretilt angles to the molecules in liquid crystal display devices and found that these challenges can be overcome by using a particular liquid crystal composition in combination with a technique of polymerizing a reactive monomer in a vertical alignment film by applying an active energy ray while applying a voltage between electrodes after a liquid crystal composition is introduced into a liquid crystal cell. Thus, the present invention has been made.

In other words, the present invention provides a liquid crystal display device that includes a first substrate, a second substrate, a liquid crystal composition layer sandwiched between the first substrate and the second substrate, an electrode that is disposed on at least one of the first substrate and the second substrate and controls liquid crystal molecules in the liquid crystal composition layer, and a vertical alignment film that is disposed on at least one of the first substrate and the second substrate and controls an alignment direction of liquid crystal molecules in the liquid crystal composition layer so that the alignment direction is substantially vertical to a surface of the first substrate and a surface of the second substrate that are adjacent to the liquid crystal composition layer. The vertical alignment film is formed of a cured product of a polymerizable liquid crystal compound, an alignment direction of the polymerizable liquid crystal compound at a surface adjacent to the liquid crystal composition layer is substantially vertical to the surface of the first substrate and the surface of the second substrate that are adjacent to the liquid crystal composition layer, and a liquid crystal composition constituting the liquid crystal composition layer contains a compound represented by general formula (1)

[Chem. 1]

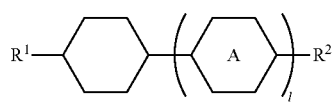

(I)

(In the formula, $R^1$ and $R^2$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; A represents a 1,4-phenylene group or a trans-1,4-cyclohexylene group; l represents 1 or 2; and when l is 2, the two A may be the same or different from each other) and a compound represented by general formula (II)

[Chem. 2]

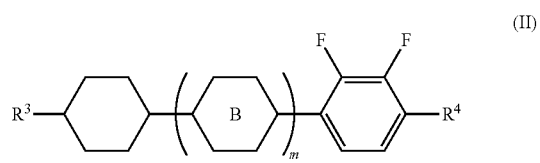

(II)

(In the formula, $R^3$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $R^4$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms; B represents a 1,4-phenylene group or a trans-1,4-cyclohexylene group; m represents 0, 1, or 2; and when m is 2, the two B may be the same or different from each other.).

The present invention also provides a method for producing a liquid crystal display device. The method includes applying an alignment material to at least one of a first substrate including a common electrode and a second substrate including a pixel electrode, the alignment material containing a polymerizable compound having a reactive group; heating the applied alignment material to form an alignment film; sandwiching a liquid crystal composition between the first substrate and the second substrate; and irradiating the alignment film with an active energy ray while applying a voltage between the common electrode and the pixel electrode to polymerize the polymerizable compound in the alignment film. The liquid crystal composition contains a compound represented by general formula (I)

[Chem. 3]

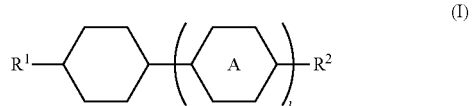

(I)

(In the formula, $R^1$ and $R^2$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; A represents a 1,4-phenylene group or a trans-1,4-cyclohexylene group; l represents 1 or 2; and when l is 2, the two A may be the same or different from each other) and a compound represented by general formula (II)

[Chem. 4]

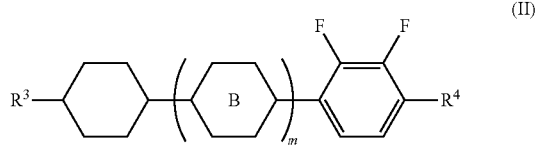

(In the formula, $R^3$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $R^4$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms; B represents a 1,4-phenylene group or a trans-1,4-cyclohexylene group; m represents 0, 1, or 2; and when m is 2, the two B may be the same or different from each other.).

Advantageous Effects of Invention

According to the present invention, the liquid crystal display device has a high response speed, suppresses ghosting, and has fewer drop marks resulting from the production process. Thus, the liquid crystal display device can be effectively used as a display device for liquid crystal TVs and monitors.

According to the present invention, liquid crystal display devices can be produced efficiently while suppressing occurrence of drop marks.

DESCRIPTION OF EMBODIMENTS

Embodiments of a liquid crystal display device and a method for producing the liquid crystal display device according to the present invention will now be described.

The embodiments are provided to specifically describe and promote better understanding of the essence of the present invention and do not limit the scope of the invention unless otherwise noted.

[Liquid Crystal Display Device]

A liquid crystal display device of the present invention includes a liquid crystal composition layer sandwiched between a pair of substrates and is based on the principle that the liquid crystal molecules in the liquid crystal composition layer work as an optical switch under application of voltage by Freedericksz transition. With regard to this, a known technology can be used.

Two substrates have electrodes for causing liquid crystals to undergo Freedericksz transition. In a common vertical alignment liquid crystal display device, a technique of vertically applying charges between the two substrates is employed. In this case, one of the electrodes is configured as a common electrode and the other electrode is configured as a pixel electrode. A typical embodiment that employs this technique is described below.

Figure 1:
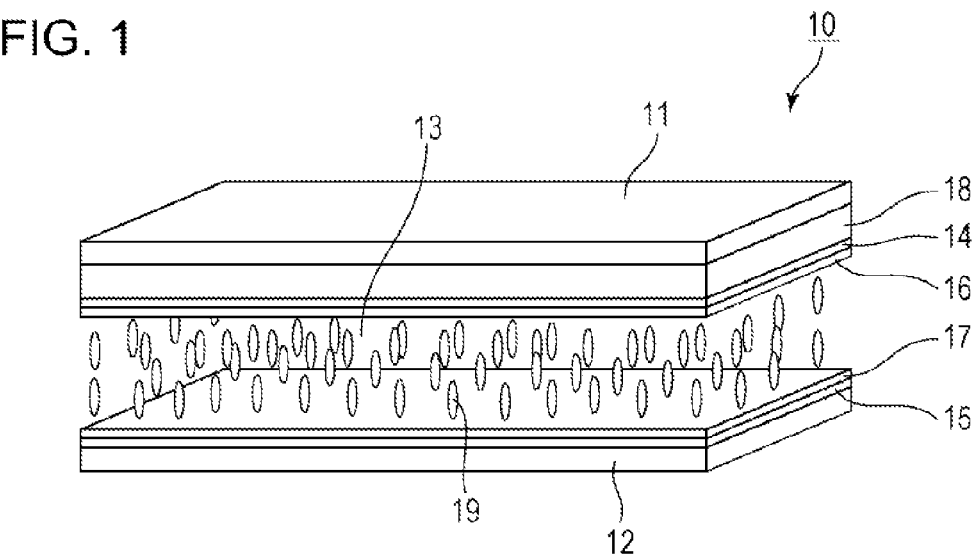
FIG. 1 is a schematic perspective view showing an embodiment of a liquid crystal display device according to the present invention.

FIG. 1 is a schematic perspective view showing an embodiment of the liquid crystal display device according to the present invention.

A liquid crystal display device 10 includes a first substrate 11; a second substrate 12; a liquid crystal composition layer 13 sandwiched between the first substrate 11 and the second substrate 12; a common electrode 14 formed on a surface of the first substrate 11, the surface facing the liquid crystal composition layer 13; a pixel electrode 15 formed on a surface of the second substrate 12, the surface facing the liquid crystal composition layer 13; a vertical alignment film 16 formed on a surface of the common electrode 14, the surface facing the liquid crystal composition layer 13; a vertical alignment film 17 formed on a surface of the pixel electrode 15, the surface facing the liquid crystal composition layer 13; and a color filter 18 interposed between the first substrate 11 and the common electrode 14.

Glass substrates or plastic substrates are used as the first substrate 11 and the second substrate 12.

Examples of the plastic substrate include substrates composed of a resin such as an acrylic resin, a methacrylic resin, polyethylene terephthalate, polycarbonate, or a cyclic olefin resin.

The common electrode 14 is usually composed of a material, such as indium-doped tin oxide (ITO), that has transparency.

The pixel electrode 15 is usually composed of a material, such as indium-doped tin oxide (ITO), that has transparency.

The pixel electrode 15 formed on the second substrate 12 has a matrix shape. The pixel electrode 15 is controlled by drain electrodes of active elements such as TFT switching elements. The TFT switching elements have gate lines which are address signal lines and source lines which are data lines arranged in a matrix. In this description, the structure of the TFT switching elements is not illustrated in the drawings.

In the case where a pixel is divided into a number of domains to tilt liquid crystal molecules in the pixel in several different directions in order to improve the viewing angle characteristics, a pixel electrode that has slits (portions where no electrode is formed) in a stripe pattern or a V-shape pattern may be provided in the pixel.

Figure 2:
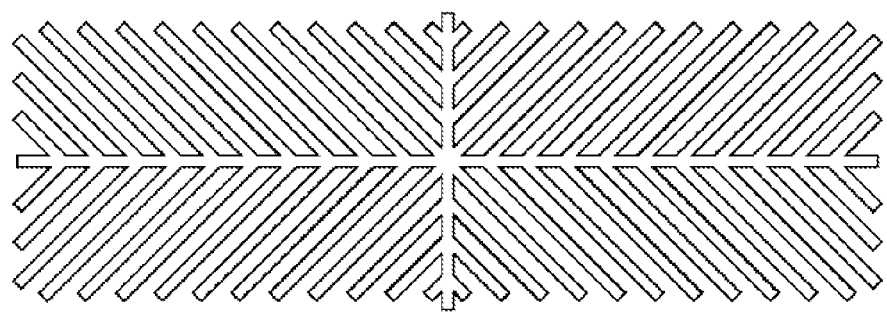
FIG. 2 is a schematic plan view showing an example of a slit electrode (comb-shape electrode) used in the liquid crystal display device according to the present invention.

FIG. 2 is a schematic plan view showing a typical geometry of a slit electrode (comb-shape electrode) for dividing a pixel into four domains. Since this slit electrode has comb-tooth slits extending in four directions from the center of the pixel, the liquid crystal molecules in the pixel that are vertically aligned relative to the substrate in the absence of an applied voltage will have their directors tilting in four different directions toward horizontal alignment under application of voltage. As a result, the liquid crystal molecules in the pixel align in plural different directions and thus a significantly wide viewing angle characteristic is achieved.

Examples of the method for dividing a pixel include, in addition to the method of forming slits in a pixel electrode, a method with which structures such as linear projections and the like are formed in a pixel and a method with which electrodes other than the pixel electrode and the common electrode are formed. Although these methods can also be used to align liquid crystal molecules in different directions, it is preferable to use a slit electrode from the viewpoints of transmittance and ease of manufacturing. A pixel electrode having slits has no power to drive liquid crystal molecules in the absence of an applied voltage and thus a pretilt angle cannot be provided to the liquid crystal molecules. However, when a slit electrode is used in combination with an alignment film material used in the present invention, a pretilt range can be provided. Moreover, a wide viewing angle can be achieved when the alignment film material is used in combination with a slit electrode that divides a pixel into domains.

In the present invention, having a pretilt angle refers to a state in which the director of liquid crystal molecules deviates slightly from a direction vertical to the substrate surface (the surface of the first substrate 11 or the surface of the second substrate 12 adjacent to the liquid crystal composition layer 13) in the absence of an applied voltage.

Since the liquid crystal display device of the present invention is a vertical alignment (VA)-type liquid crystal display device, the director of the liquid crystal molecules is aligned substantially vertically to the substrate surface in the absence of an applied voltage. In order to have the liquid crystal molecules align vertically, a vertical alignment film is usually used. Examples of the material constituting the vertical alignment film (vertical alignment film material) include polyimide, polyamide, and polysiloxane. Among these, polyimide is preferable.

The vertical alignment film material may include a mesogenic moiety but is preferably free of mesogenic moieties unlike in the polymerizable compound described below. When the vertical alignment film material contains a mesogenic moiety, for example, ghosting caused by disturbance of the molecular alignment may result from repeated voltage application.

When the vertical alignment film is to be composed of polyimide, a polyimide solution in which a mixture of tetracarboxylic dianhydride and a diisocyanate, polyamic acid, and polyimide are dissolved or dispersed in a solvent is preferably used. In this case, the polyimide content in the polyimide solution is preferably 1 mass % or more and 10 mass % or less, more preferably 3 mass % or more and 5 mass % or less, and most preferably 10 mass % or less.

In contrast, when a polysiloxane-based vertical alignment film is to be used, a polysiloxane solution prepared by dissolving polysiloxane produced by heating a mixture of a silicon compound having an alkoxy group, an alcohol derivative, and an oxalic acid derivative mixed at particular ratios can be used.

In the liquid crystal display device of the present invention, the vertical alignment film formed of polyimide or the like contains a polymer formed by polymerization of a polymerizable compound having a reactive group. This polymerizable compound helps fix the pretilt angle of the liquid crystal molecules. In other words, the directors of the liquid crystal molecules in the pixel can be made to tilt in different directions under application of voltage by using a slit electrode and the like. However, even in a structure that uses a slit electrode, the liquid crystal molecules are substantially vertically aligned relative to the substrate surface in the absence of an applied voltage and no pretilt angle is formed.

According to the PSA method described above, UV light or the like is applied while applying a voltage between the electrodes to slightly tilt the liquid crystal molecules so as to polymerize the reactive monomer in the liquid crystal composition and to provide an appropriate pretilt angle.

In the liquid crystal display device of this invention, UV light or the like is applied while applying a voltage between the electrodes to slightly tilt the liquid crystal molecules so as to provide a pretilt angle as with the PSA method. However, unlike the PSA method, no polymerizable compound is contained in the liquid crystal composition. In the present invention, a polymerizable compound having a reactive group is added to the vertical alignment film material such as polyimide or the like in advance, the liquid crystal composition is sandwiched between the substrates, and then the polymerizable compound is cured under application of voltage to provide pretilt angles. This is essentially different from the PSA method in that the phase separation of the polymerizable compound is not utilized.

In the present invention, substantially vertical refers to a state in which the director of vertically aligned liquid crystal molecules is slightly tilted from the vertical direction and has a pretilt angle. Assuming that the pretilt angle is 90° when the director is perfectly vertical and the pretilt angle is 0° when the alignment is homogeneous (horizontal to the substrate surface), substantially vertical preferably refers to an angle of 89 to 85° and more preferably 89 to 87°.

The vertical alignment film that contains a polymer of a polymerizable compound that has a reactive group is formed by an effect of the polymerizable compound added to the vertical alignment film material. Presumably, the vertical alignment film and the polymerizable compound are intricately entangled to form a type of a polymer alloy; however, its exact structure cannot be identified.

(Polymerizable Compound Having Reactive Group)

The polymerizable compound having a reactive group may or may not contain a mesogenic moiety. The polymer of the polymerizable compound having a reactive group preferably has a crosslinked structure from the viewpoint of durability. The polymerizable compound having a reactive group is preferably a difunctional, trifunctional, or higher functional polymerizable compound having two or more reactive groups from the viewpoint of durability.

The reactive group of the polymerizable compound having a reactive group is preferably a photopolymerizable substituent. In particular, the reactive group is preferably a photopolymerizable substituent since, in making a vertical alignment film by thermal polymerization by thermally polymerizing the vertical alignment film material, the reaction of the polymerizable compound having a reactive group can be suppressed.

The polymerizable compound having a reactive group is specifically preferably a polymerizable compound represented by general formula (V) below:

[Chem. 5]

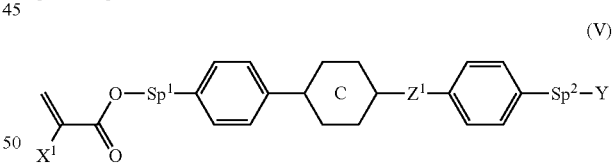

(V)

(In the formula, $X^1$ represents a hydrogen atom or a methyl group; $Sp^1$ and $Sp^2$ each independently represent a single bond, an alkylene group having 1 to 8 carbon atoms, or —O—$(CH_2)_s$— (in the formula, s represents an integer of 2 to 7 and the oxygen atom is to bond with an aromatic ring); $Z^1$ represents —$OCH_2$—, —$CH_2O$—, —COO—, —OCO—, —$CF_2O$—, —$OCF_2$—, —$CH_2CH_2$—, —$CF_2CF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —$CY^1$=$CY^2$—, —C≡C—, or a single bond; Y represents an alkyl group having 1 to 8 carbon atoms, an alkenyl group having 2 to 8 carbon atoms, an alkoxy group having 1 to 8 carbon atoms, an alkenyloxy group having 2 to 8 carbon atoms, a hydrogen atom, a fluorine atom, a cyano group, or a structure below

[Chem. 6]

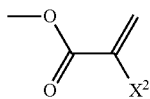

(In the formula, $X^2$ represents a hydrogen atom or a methyl group.); C represents a 1,4-phenylene group, a trans-1,4-cyclohexylene group, or a single bond; D represents a 1,4-phenylene group or a trans-1,4-cyclohexylene group; and in C or D, any hydrogen atom in the 1,4-phenylene group may be substituted with a fluorine atom).

In general formula (V) above, $X^1$ and $X^1$ each independently represent a hydrogen atom or a methyl group. If the reaction speed is important, a hydrogen atom is preferable. If reducing the amount of reaction residues is important, a methyl group is preferable.

In general formula (V) above, $Sp^1$ and $Sp^2$ each independently represent a single bond, an alkylene group having 1 to 8 carbon atoms, or —O—$(CH_2)_s$— (in the formula, s represents an integer of 2 to 7 and the oxygen atom is to bond with an aromatic ring). However, the carbon chain is preferably not long. A single bond or an alkylene group having 1 to 5 carbon atoms is preferred. A single bond or an alkylene group having 1 to 3 carbon atoms is more preferred. When $Sp^1$ and $Sp^2$ each represent —O—$(CH_2)_s$—, s is preferably 1 to 5 and more preferably 1 to 3. At least one of $Sp^1$ and $Sp^2$ is preferably a single bond. More preferably, both $Sp^1$ and $Sp^2$ are a single bond.

In general formula (V), $Z^1$ represents —$OCH_2$—, —$CH_2O$—, —COO—, —OCO—, —$CF_2O$—, —$OCF_2$—, —$CH_2CH_2$—, —$CF_2CF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —$CY^1$=$CY^2$—, —C≡C—, or a single bond. $Z^1$ preferably represents —$OCH_2$—, —$CH_2O$—, —COO—, —OCO—, —$CF_2O$—, —$OCF_2$—, —$CH_2CH_2$—, —$CF_2CF_2$—, or a single bond and more preferably represents a single bond.

In general formula (V) above, C may be a 1,4-phenylene group that may have any hydrogen atom substituted with a fluorine atom, a trans-1,4-cyclohexylene group, or a single bond but is preferably a 1,4-phenylene group or a single bond.

When C represents a cyclic structure and not a single bond, $Z^1$ is preferably a linking group other than a single bond. When C is a single bond, $Z^1$ is preferably a single bond.

A compound with Y representing an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, a hydrogen atom, a fluorine atom, or a cyano group is a monofunctional polymerizable liquid crystal compound and Y does not have a polymerizable skeleton. In contrast, a compound with Y representing the aforementioned polymerizable skeleton is a difunctional polymerizable liquid crystal compound. In the present invention, either the monofunctional polymerizable liquid crystal compound or a difunctional polymerizable liquid crystal compound can be used. From the viewpoint of heat resistance, a difunctional polymerizable liquid crystal compound is preferred and both may be used simultaneously.

In sum, the polymerizable compound having a cyclic structure is preferably any of compounds represented by general formulae (V-1) to (V-6) below, more preferably any one of compounds represented by general formulae (V-1) to (V-4) below, and most preferably a compound represented by general formula (V-2) below.

[Chem. 7]

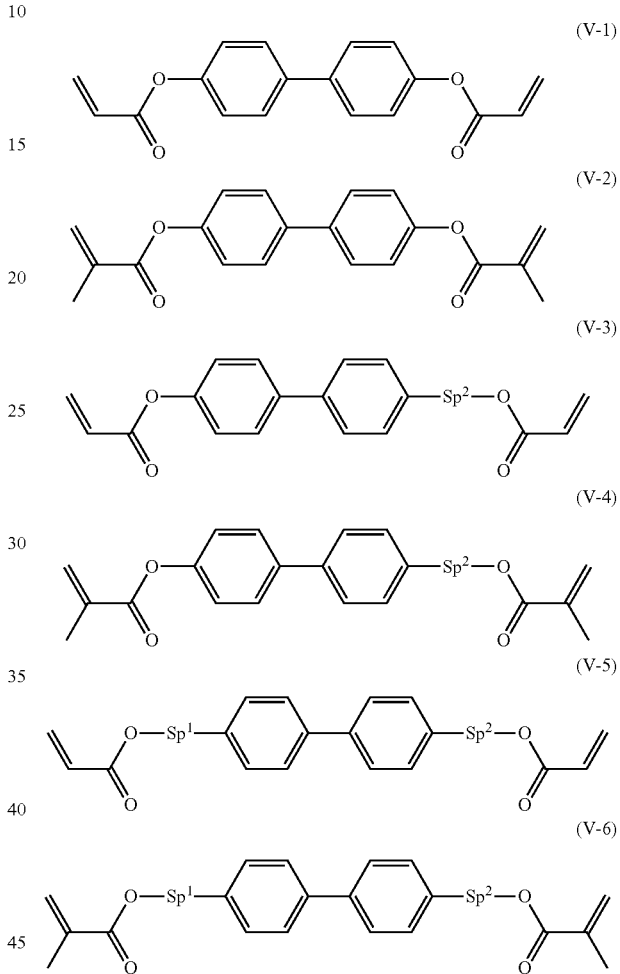

(Liquid Crystal Composition)

The liquid crystal composition of the present invention preferably contains 30 to 65 mass %, more preferably 30 to 50 mass %, yet more preferably 35 to 45 mass %, and most preferably 38 to 42 mass % of a compound represented by general formula (I) below as a first component.

[Chem. 8]

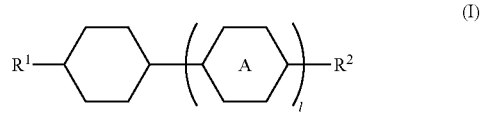

(In the formula, $R^1$ and $R^2$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; A represents a 1,4-phenylene group or a trans-1,4-cyclohexylene group; l represents 1 or 2; and when l is 2, the two A may be the same or different from each other.)

In general formula (I) above, $R^1$ and $R^2$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms.

$R^1$ and $R^2$ preferably each represent an alkyl group having 1 to 5 carbon atoms, an alkenyl group having 2 to 5 carbon atoms, an alkoxy group having 1 to 5 carbon atoms, or an alkenyloxy group having 2 to 5 carbon atoms.

$R^1$ and $R^2$ more preferably each represent an alkyl group having 2 to 5 carbon atoms, an alkenyl group having 2 to 4 carbon atoms, an alkoxy group having 1 to 4 carbon atoms, or an alkenyloxy group having 2 to 4 carbon atoms.

$R^1$ and $R^2$ most preferably each represent an alkyl group having 2 to 5 carbon atoms or an alkenyl group having 2 to 4 carbon atoms.

When $R^1$ represents an alkyl group, an alkyl group having 1, 3, or 5 carbon atoms is particularly preferable. When $R^1$ represents an alkenyl group, the following structures are preferable.

[Chem. 9]

(In the formulae, the end on the right-hand side bonds with the cyclic structure.)

Of the above-described structures, a vinyl group or a 1-propenyl group which is an alkenyl group having 2 or 3 carbon atoms is particularly preferable.

In general formula (I) above, $R^1$ and $R^2$ may be the same or different from each other but are preferably different from each other. When both $R^1$ and $R^2$ are an alkyl group, they are preferably alkyl groups having 1, 3, or 5 carbon atoms with numbers of carbon atoms different from each other.

The content of the compound represented by general formula (I) above in which at least one substituent selected from $R^1$ and $R^2$ is an alkyl group having 3 to 5 carbon atoms is preferably 50 mass % or more, more preferably 70 mass % or more, and most preferably 80 mass % or more of the compound represented by general formula (I) above.

The content of the compound represented by general formula (I) above in which at least one substituent selected from $R^1$ and $R^2$ is an alkyl group having 3 carbon atoms is preferably 50 mass % or more, more preferably 70 mass % or more, yet more preferably 80 mass % or more, and most preferably 100% of the compound represented by general formula (I) above.

In general formula (I) above, A represents a 1,4-phenylene group or a trans-1,4-cyclohexylene group but preferably represents a trans-1,4-cyclohexylene group. The content of the compound represented by general formula (I) in which A represents a trans-1,4-cyclohexylene group is preferably 50 mass % or more, more preferably 70 mass % or more, and most preferably 80 mass % or more of the compound represented by general formula (I).

The compound represented by general formula (I) is preferably any one of compounds represented by general formulae (Ia) to (Ik) below:

[Chem. 10]

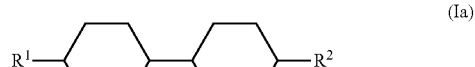

(Ia)

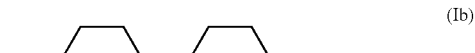

(Ib)

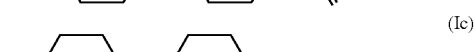

(Ic)

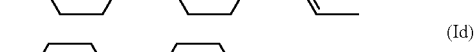

(Id)

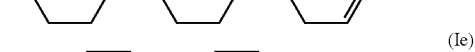

(Ie)

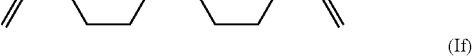

(If)

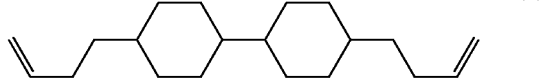

(Ig)

(Ih)

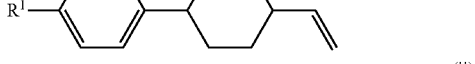

(Ij)

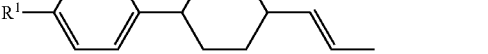

(Ik)

(In the formulae, $R^1$ and $R^2$ each independently represent an alkyl group having 1 to 5 carbon atoms or an alkoxy group having 1 to 5 carbon atoms but the embodiments similar to $R^1$ and $R^2$ in general formula (I) are preferred.)

Among general formulae (Ia) to (Ik) above, general formulae (Ia), (Ib), and (Ig) are preferable and general formulae (Ia) and (Ig) are more preferable. In order to improve the response speed, reduce ghosting, and suppress drop marks in a well balanced manner, general formula (Ia) is particularly preferable. When the response speed is important, general formula (Ib) is also preferable. When the response speed is critical, general formulae (Ib), (Ie), (If), and (Ih) are preferable. The dialkenyl compounds represented by general formulae (Ie) and (If) are particularly preferable when the response speed is important.

Based on these points, the content of the compounds represented by general formulae (Ia) and (Ig) is preferably 50 mass % or more, more preferably 70 mass % or more, yet more preferably 80 mass % or more, and most preferably 100 mass % of the compound represented by general formula (I) above. The content of the compound represented by general formula (Ia) above is preferably 50 mass % or more, more preferably 70 mass % or more, and most preferably 80 mass % or more of the compound represented by general formula (I).

The liquid crystal composition of the present invention preferably contains 5 to 20 mass %, more preferably 10 to 15 mass %, and most preferably 12 to 14 mass % of a compound represented by general formula (II-1) below as a second component.

[Chem. 11]

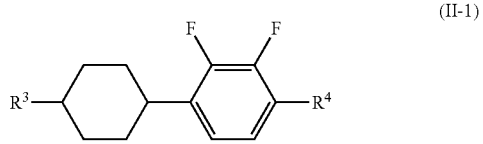

(II-1)

(In the formula, $R^3$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; and $R^4$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms.)

In general formula (II-1) above, $R^3$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms.

$R^3$ preferably represents an alkyl group having 1 to 5 carbon atoms or an alkenyl group having 2 to 5 carbon atoms.

$R^3$ more preferably represents an alkyl group having 2 to 5 carbon atoms or an alkenyl group having 2 to 4 carbon atoms.

$R^3$ yet more preferably represents an alkyl group having 3 to 5 carbon atoms or an alkenyl group having 2 carbon atoms.

$R^3$ most preferably represents an alkyl group having 3 carbon atoms.

In general formula (II-1) above, $R^4$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms.

$R^4$ preferably represents an alkyl group having 1 to 5 carbon atoms or an alkoxy group having 1 to 5 carbon atoms.

$R^4$ more preferably represents an alkyl group having 1 to 3 carbon atoms or an alkoxy group having 1 to 3 carbon atoms.

$R^4$ yet more preferably represents an alkyl group having 3 carbon atoms or an alkoxy group having 2 carbon atoms.

$R^4$ most preferably represents an alkoxy group having 2 carbon atoms.

The compound represented by general formula (II-1) above is specifically preferably a compound represented by general formula (II-1a) or (II-1b) below:

[Chem. 12]

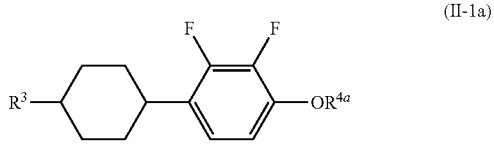

(II-1a)

-continued

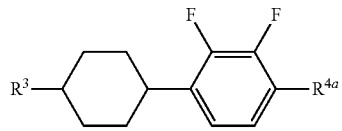

(II-1b)

(In the formulae, $R^3$ represents an alkyl group having 1 to 5 carbon atoms or an alkenyl group having 2 to 5 carbon atoms; and $R^{4a}$ represents an alkyl group having 1 to 5 carbon atoms.)

In general formula (II-1a), $R^3$ is preferably similar to embodiments for general formula (II-1) described above.

In general formula (II-1a) above, $R^4$ is preferably an alkyl group having 1 to 3 carbon atoms, more preferably an alkyl group having 1 or 2 carbon atoms, and most preferably an alkyl group having 2 carbon atoms.

In general formula (II-1b) above, $R^3$ is preferably similar to embodiments for general formula (II-1) described above.

In general formula (II-1a) above, $R^4$ is preferably an alkyl group having 1 to 3 carbon atoms, more preferably an alkyl group having 1 or 3 carbon atoms, and most preferably an alkyl group having 3 carbon atoms.

Of general formulae (II-1a) and (II-1b), general formula (II-1a) is preferable in order to increase the absolute value of the dielectric anisotropy.

The liquid crystal composition of the present invention preferably contains 25 to 45 mass %, more preferably 30 to 40 mass %, and most preferably 31 to 36 mass % of a compound represented by general formula (II-2) below as a third component.

[Chem. 13]

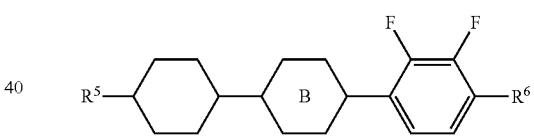

(II-2)

(In the formula, $R^3$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $R^4$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms; B represents a 1,4-phenylene group or a trans-1,4-cyclohexylene group; m represents 0, 1, or 2; and when m is 2, the two B may be the same or different from each other.)

In general formula (II-2) above, $R^5$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms.

$R^5$ preferably represents an alkyl group having 1 to 5 carbon atoms or an alkenyl group having 2 to 5 carbon atoms.

$R^5$ more preferably represents an alkyl group having 2 to 5 carbon atoms or an alkenyl group having 2 to 4 carbon atoms.

$R^5$ more yet preferably represents an alkyl group having 3 to 5 carbon atoms or an alkenyl group having 2 carbon atoms.

$R^5$ most preferably represents an alkyl group having 3 carbon atoms.

In general formula (II-2), $R^6$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms.

$R^6$ preferably represents an alkyl group having 1 to 5 carbon atoms or an alkoxy group having 1 to 5 carbon atoms.

$R^6$ more preferably represents an alkyl group having 1 to 3 carbon atoms or an alkoxy group having 1 to 3 carbon atoms.

$R^6$ yet more preferably represents an alkyl group having 3 carbon atoms or an alkoxy group having 2 carbon atoms.

$R^6$ most preferably represents an alkoxy group having 2 carbon atoms.

In general formula (II-2), B represents a 1,4-phenylene group which may be substituted with fluorine or a trans-1,4-cyclohexylene group. B preferably represents an unsubstituted 1,4-phenylene group or a trans-1,4-cyclohexylene group and more preferably a trans-1,4-cyclohexylene group.

The compound represented by general formula (II-2) above is preferably a compound represented by any one of general formulae (II-2a) to (II-2d) below.

[Chem. 14]

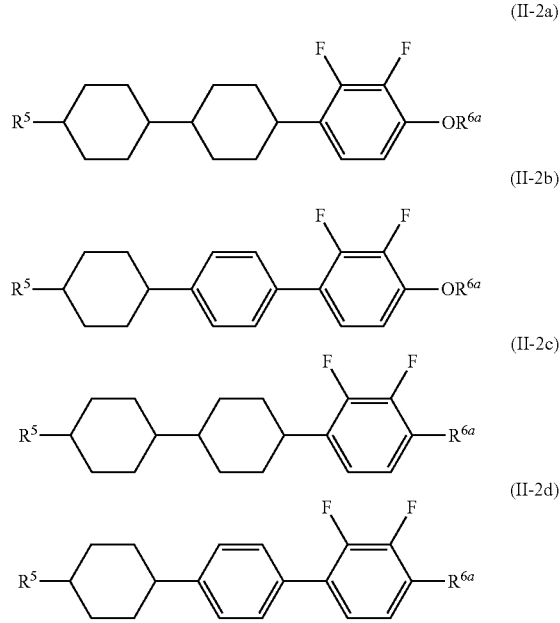

(In the formulae, $R^5$ represents an alkyl group having 1 to 5 carbon atoms or an alkenyl group having 2 to 5 carbon atoms; $R^{6a}$ represents an alkyl group having 1 to 5 carbon atoms; and $R^5$ and $R^{6a}$ are preferably similar to embodiments of $R^5$ and $R^6$ in general formula (II-2).)

In general formulae (II-2a) and (II-2b), $R^5$ is preferably similar to the embodiment in general formula (II-2).

In general formulae (II-2a) and (II-2b), $R^{6a}$ is preferably an alkyl group having 1 to 3 carbon atoms, more preferably an alkyl group having 1 or 2 carbon atoms, and most preferably an alkyl group having 2 carbon atoms.

In general formulae (II-2c) and (II-2d), $R^5$ is preferably similar to the embodiment in general formula (II-2).

In general formulae (II-2c) and (II-2d), $R^{6a}$ is preferably an alkyl group having 1 to 3 carbon atoms, more preferably an alkyl group having 1 or 3 carbon atoms, and most preferably an alkyl group having 3 carbon atoms.

Of general formulae (II-2a) and (II-2b) above, general formula (II-2a) is preferred in order to increase the absolute value of the dielectric anisotropy. For a composition with a high Δn, general formula (II-2b) is preferred.

The liquid crystal composition of the present invention preferably contains 5 to 20 mass %, more preferably 8 to 15 mass %, and most preferably 10 to 13 mass % of a compound represented by general formula (III) below as a fourth component.

[Chem. 15]

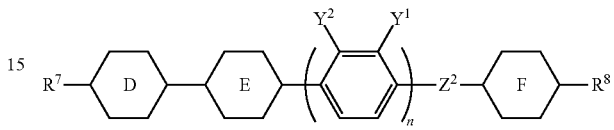

(In the formula, $R^7$ and $R^8$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $Y^1$ and $Y^2$ each independently represent a hydrogen atom or a fluorine atom; D, E, and F each independently represent a 1,4-phenylene group or trans-1,4-cyclohexylene; $Z^2$ represents a single bond, —OCH$_2$—, —OCO—, —CH$_2$O—, or —COO—; and n represents 0 or 1.)

In general formula (III), $R^7$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms.

When D represents trans-1,4-cyclohexylene, $R^7$ preferably represents an alkyl group having 1 to 5 carbon atoms or an alkenyl group having 2 to 5 carbon atoms, more preferably represents an alkyl group having 2 to 5 carbon atoms or an alkenyl group having 2 to 4 carbon atoms, yet more preferably represents an alkyl group having 3 to 5 carbon atoms or an alkenyl group having 2 carbon atoms, and most preferably represents an alkyl group having 3 carbon atoms.

When D represents a 1,4-phenylene group which may be substituted with fluorine, $R^7$ preferably represents an alkyl group having 1 to 5 carbon atoms or an alkenyl group having 4 or 5 carbon atoms, more preferably represents an alkyl group having 2 to 5 carbon atoms or an alkenyl group having 4 carbon atoms, and most preferably represents an alkyl group having 2 to 4 carbon atoms.

In general formula (III) above, $R^8$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms.

When F represents trans-1,4-cyclohexylene, $R^8$ preferably represents an alkyl group having 1 to 5 carbon atoms or an alkenyl group having 2 to 5 carbon atoms, more preferably represents an alkyl group having 2 to 5 carbon atoms or an alkenyl group having 2 to 4 carbon atoms, yet more preferably represents an alkyl group having 3 to 5 carbon atoms or an alkenyl group having 2 carbon atoms, and most preferably represents an alkyl group having 3 carbon atoms.

When F represents a 1,4-phenylene group which may be substituted with fluorine, $R^8$ preferably represents an alkyl group having 1 to 5 carbon atoms or an alkenyl group having 4 or 5 carbon atoms, more preferably represents an alkyl group having 2 to 5 carbon atoms or an alkenyl group having 4 carbon atoms, and most preferably represents an alkyl group having 2 to 4 carbon atoms.

When $R^7$ and $R^8$ each represent an alkenyl group and D or F bonded thereto represents a 1,4-phenylene group which may be substituted with fluorine in general formula (III), the alkenyl group having 4 or 5 carbon atoms preferably has a structure represented by a formula below:

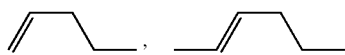
[Chem. 16]

(In the formulae, the end on the right-hand side is bonded to the cyclic structure.)

In this case also, an alkenyl group having 4 carbon atoms is more preferable.

In general formula (III) above, $Y^1$ and $Y^2$ each independently represent a hydrogen atom or a fluorine atom. Preferably, at least one of $Y^1$ and $Y^2$ represents a fluorine atom. When the absolute value of the dielectric anisotropy is important, both $Y^1$ and $Y^2$ preferably represent a fluorine atom.

In general formula (III) above, D, E, and F each independently represent a 1,4-phenylene group, which may be substituted with fluorine, or trans-1,4-cyclohexylene but preferably represent an unsubstituted 1,4-phenylene group or trans-1,4-cyclohexylene.

In general formula (III) above, $Z^2$ represents a single bond, —OCH$_2$—, —OCO—, —CH$_2$O—, or —COO—. $Z^2$ preferably represents a single bond, —CH$_2$O—, or —COO— and more preferably represents a single bond.

In general formula (III), n represents 0 or 1. When Z represents a substituent and not a single bond, n preferably represents 0.

The compound represented by general formula (III) with n representing 0 is specifically preferably a compound represented by any one of general formulae (III-1a) to (III-1h) below.

[Chem. 17]

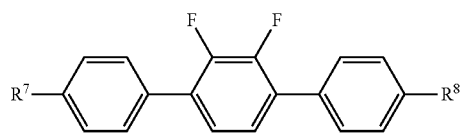
(III-1a)

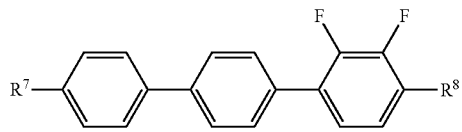
(III-1b)

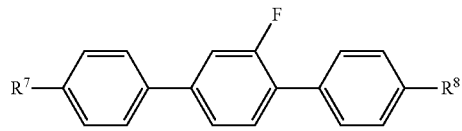
(III-1c)

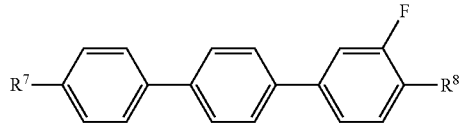
(III-1d)

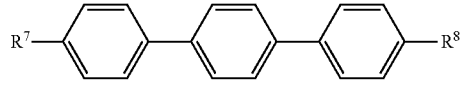
(III-1e)

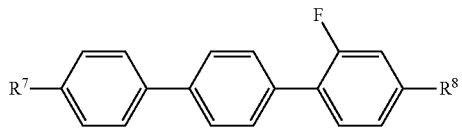
(III-1f)

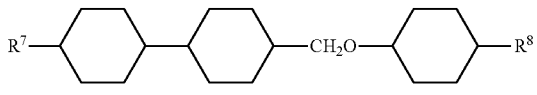
(III-1g)

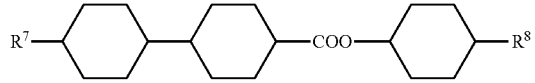
(III-1h)

(In formulae, $R^7$ and $R^8$ each independently represent an alkyl group having 1 to 5 carbon atoms, an alkenyl group having 2 to 5 carbon atoms, or an alkoxy group having 1 to 5 carbon atoms but are preferably similar to the embodiments of $R^7$ and $R^8$ in general formula (III).)

The compound represented by general formula (III) with n representing 1 is specifically preferably a compound represented by any one of general formulae (III-2a) to (III-2l) below.

[Chem. 18]

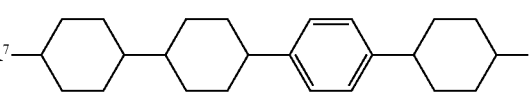
(III-2a)

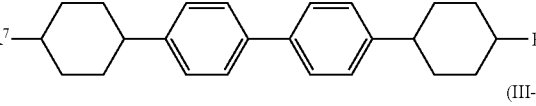
(III-2b)

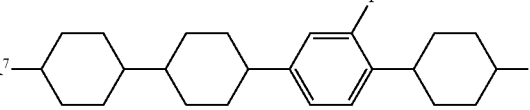
(III-2c)

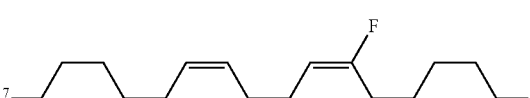
(III-2d)

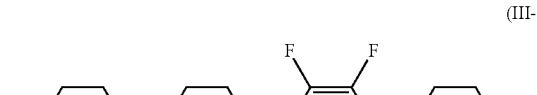
(III-2e)

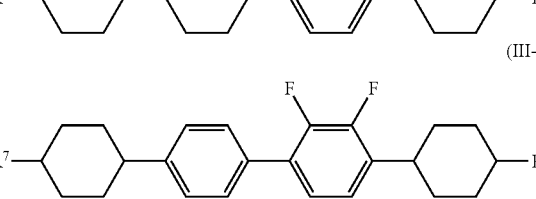
(III-2f)

-continued

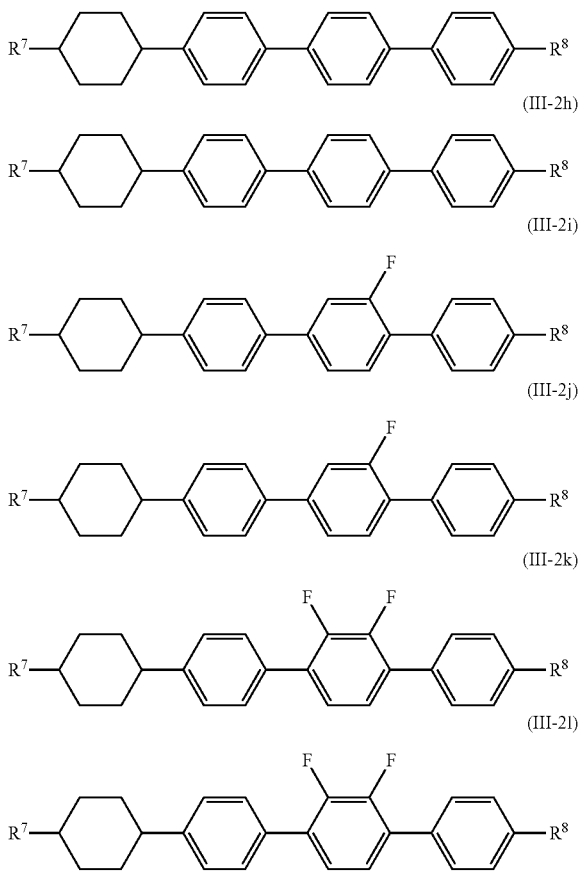

(In formulae, $R^7$ and $R^8$ each independently represent an alkyl group having 1 to 5 carbon atoms, an alkenyl group having 2 to 5 carbon atoms, or an alkoxy group having 1 to 5 carbon atoms but are preferably similar to the embodiments of $R^7$ and $R^8$ in general formula (III).)

The liquid crystal composition of the present invention is constituted by a combination of compounds represented by general formulae (I) to (III) above. The contents of the respective compounds contained in combination are preferably as follows.

The compounds represented by general formulae (II-1) and (II-2) are each a compound having a negative dielectric anisotropy with a relatively large absolute value. The total content of these compounds in the liquid crystal composition is preferably 30 to 65 mass %, more preferably 40 to 55 mass %, and most preferably 43 to 50 mass %.

The compound represented by general formula (III) above may have a positive dielectric anisotropy or a negative dielectric anisotropy. When a compound represented by general formula (III) with a negative dielectric anisotropy having an absolute value of 0.3 or more is used, the total content of the compounds represented by general formulae (I-1), (II-2), and (III) is preferably 35 to 70 mass %, more preferably 45 to 65 mass %, and most preferably 50 to 60 mass %.

The liquid crystal composition of the present invention preferably contains 30 to 50 mass % of a compound represented by general formula (I) above, and a total of 35 to 70 mass % of compounds represented by general formulae (II-1), (II-2), and (III).

More preferably, the liquid crystal composition contains 35 to 45 mass % of a compound represented by general formula (I) above, and a total of 45 to 65 mass % of compounds represented by general formulae (II-1), (II-2), and (III).

Yet more preferably, the liquid crystal composition contains 38 to 42 mass % of a compound represented by general formula (I) above, a total of 50 to 60 mass % of compounds represented by general formulae (II-1), (II-2), and (III).

The total content of the compounds represented by general formulae (I), (II-1), (II-2), and (III) is preferably 80 to 100 mass %, more preferably 90 to 100 mass %, and most preferably 95 to 100 mass % relative to the entire liquid crystal composition.

The liquid crystal composition of the present invention can be used in a wide range of the nematic phase-isotropic liquid phase transition temperature ($T_{ni}$). The nematic phase-isotropic liquid phase transition temperature ($T_{ni}$) is preferably 60 to 120° C., more preferably 70 to 100° C., and most preferably 70 to 85° C.

The dielectric anisotropy of the liquid crystal composition of the present invention is preferably −2.0 to −6.0, more preferably −2.5 to −5.0, and most preferably −2.5 to −3.5 at 25° C.

The refractive index anisotropy of the liquid crystal composition of the present invention is preferably 0.08 to 0.13 and more preferably 0.09 to 0.12 at 25° C. To be more specific, when the cell gap is small, the refractive index anisotropy of the liquid crystal composition of the present invention is preferably 0.10 to 0.12 at 25° C. When the cell gap is large, the refractive index anisotropy of the liquid crystal composition of the present invention is preferably 0.08 to 0.10 at 25° C.

[Method for Producing Liquid Crystal Display Device]

Next, a method for producing a liquid crystal display device of the present invention is described with reference to FIG. 1.

An alignment material that contains a polymerizable compound having a reactive group and a vertical alignment film material is applied to a surface of the first substrate 11 on which the common electrode 14 is formed and to a surface of the second substrate 12 on which the pixel electrode 15 is formed and heated to form the vertical alignment films 16 and 17.

In this step, first, an alignment material that contains a polymer compound precursor (polymerizable compound) that forms a first polymer compound and a polymerizable compound such as a compound represented by general formula (V) or a photo-polymerizable or photo-crosslinkable compound is prepared.

When the first polymer compound is polyimide, the polymer compound precursor is, for example, a polyimide solution in which a mixture of tetracarboxylic dianhydride and a diisocyanate, polyamic acid, and polyimide are dissolved or dispersed in a solvent. The polyimide content in the polyimide solution is preferably 1 mass % or more and 10 mass % or less and more preferably 3 mass % or more and 5 mass % or less.

When the first polymer compound is polysiloxane, the polymer compound precursor is, for example, a polysiloxane solution prepared by dissolving, in a solvent, polysiloxane produced by heating a mixture of a silicon compound having an alkoxy group, a silicon compound having a halogenated alkoxy group, an alcohol, and an oxalic acid derivative mixed at particular ratios.

If needed, a photo-crosslinkable compound, a photopolymerization initiator, a solvent, and the like may be added to the alignment material.

After the alignment material is prepared, the alignment material is applied to or printed on each of the first substrate 11 and the second substrate 12 so as to cover the common electrode 14, and the pixel electrode 15 and slit portions (not shown in the drawing), and then subjected to a treatment such as heating. As a result, the polymer compound precursor contained in the applied or printed alignment material is polymerized and cured to form a first polymer compound and vertical alignment films 16 and 17 that contain the first polymer compound and the polymerizable compound are formed.

In the case where a heat treatment is to be performed, the temperature is preferably 80° C. or higher and more preferably in the range of 150 to 200° C.

The alignment control portion that contains the first polymer compound is formed at this stage. A treatment such as rubbing may be conducted after this as needed.

Next, the first substrate 11 and the second substrate 12 are stacked and the liquid crystal composition layer 13 containing liquid crystal molecules is sealed in between the substrates.

In particular, spacer projections, such as plastic beads for example, for securing the cell gap are scattered onto the surface of one of the first substrate 11 and the second substrate 12 on which the vertical alignment film 16 or 17 is formed and a sealing portion is printed by screen printing using an epoxy adhesive or the like.

Then the first substrate 11 and the second substrate 12 are bonded to each other with the spacer projections and the sealing portion therebetween so that the vertical alignment films 16 and 17 face each other and then a liquid crystal composition containing liquid crystal molecules is poured.

Then the sealing portion is cured by heating or the like to seal in the liquid crystal composition between the first substrate 11 and the second substrate 12.

Next, voltage is applied between the common electrode 14 and the pixel electrode 15 by using voltage application means. For example, a voltage of 5 to 30 (V) is applied. As a result, an electric field is generated in a direction that forms a particular angle with the surface of the first substrate 11 adjacent to the liquid crystal composition layer 13 (the surface facing the liquid crystal composition layer 13) and the surface of the second substrate 12 adjacent to the liquid crystal composition layer 13 (surface facing the liquid crystal composition layer 13). Thus liquid crystal molecules 19 tilt in a particular direction from a normal direction of the first substrate 11 and the second substrate 12. At this stage, the tilt angle of the liquid crystal molecules 19 is substantially equal to the pretilt angle provided to the liquid crystal molecules 19 in the step described below. Accordingly, the magnitude of the pretilt θ of the liquid crystal molecules 19 can be controlled by appropriately adjusting the magnitude of the voltage (refer to FIG. 3).

Then ultraviolet light UV is applied to the liquid crystal composition layer 13 from the outer side of the first substrate 11, for example, while applying the voltage so as to polymerize the polymerizable compound in the vertical alignment films 16 and 17 and form a second polymer compound.

In this case, the intensity of the ultraviolet light UV applied may be constant or varied. In the case where the intensity of irradiation is to be varied, the irradiation time at the respective strength may be any. When irradiation is conducted in two or more stages, the irradiation intensity of the second stage and onward is preferably smaller than the irradiation intensity of the first stage. The total irradiation time of the second stage and onward is preferably longer than the irradiation time of the first stage. The total irradiation energy quantity of the second stage and onward is also preferably higher than that of the first stage. When the irradiation intensity is to be discontinuously varied, the average irradiation intensity in the first half of the entire irradiation time is preferably larger than the average irradiation intensity in the second half. Preferably, the intensity immediately after start of irradiation is the highest. More preferably, the irradiation intensity keeps decreasing to a particular value with the passage of the irradiation time. The ultraviolet light UV intensity in this case is preferably 2 mW/cm$^{-2}$ to 100 mW/cm$^{-2}$. More preferably, the highest irradiation intensity in the first stage of multi-stage irradiation or in all irradiation stages in which the irradiation intensity is discontinuously varied is 10 mW/cm$^{-2}$ to 100 mW/cm$^{-2}$; and the lowest irradiation intensity in the second stage and onward of multi-stage irradiation or in discontinuously varying the irradiation intensity is 2 mW/cm$^{-2}$ to 50 mW/cm$^{-2}$. The total irradiation energy quantity is preferably 10 J to 300 J, more preferably 50 J to 250 J, and most preferably 100 J to 250 J.

In such a case, the applied voltage may be AC or DC.

As a result, alignment regulating portions (not shown in the drawings) fixed to the alignment control portions of the vertical alignment film 16 and 17 and containing the second polymer compound are formed. The alignment regulating portions provide a pretilt θ to the liquid crystal molecules 19 located near the interfaces between the liquid crystal composition layer 13 and the vertical alignment film 16 and between the liquid crystal composition layer 13 and the vertical alignment film 17 in a non-operating state. Although ultraviolet light UV is applied from the outer side of the first substrate 11, it may be applied from the outer side of the second substrate 12 or from both the outer side of the first substrate 11 and the outer side of the second substrate 12.

As described above, in the liquid crystal display device of the present invention, the liquid crystal molecules 19 in the liquid crystal composition layer 13 have a particular pretilt θ. Thus, compared to a liquid crystal display device not subjected to a pretilt treatment and a liquid crystal display apparatus that includes such a liquid crystal display device, the speed of response to the driving voltage can be significantly improved.

In the liquid crystal display device of the present invention, the polymer compound precursor constituting the vertical alignment films 16 and 17 is preferably a polyimide precursor that is not sensitive to light.

The content of the polymerizable compound, in particular, a compound represented by general formula (V) above is preferably 0.5 to 4 mass % and more preferably 1 to 2 mass % in the polymer compound precursor.

EXAMPLES

The present invention will now be described in more specific details through Examples and Comparative Examples. It should be understood that the present invention is not limited to Examples described below. For the compositions of Examples and Comparative Examples, "%" means "mass %".

In Examples and Comparative Examples below, $T_{ni}$, Δn, Δε, η, and $γ_1$ are defined as follows:
$T_{ni}$: Nematic phase-isotropic liquid phase transition temperature (° C.)
Δn: Refractive index anisotropy at 25° C.
Δε: Dielectric anisotropy at 25° C.
η: Rotational viscosity at 20° C. (mPa·s)
$γ_1$: Rotational viscosity at 25° C. (mPa·s)

Liquid crystal display devices of Examples and Comparative Examples below were evaluated by the following methods in terms of ghosting and drop marks.

(Ghosting)

A particular fixed pattern was displayed in a display area for 1000 hours and then an image is evenly displayed in all parts of the screen during which the level of the afterimage of the fixed pattern was observed with naked eye. The ghosting level of the liquid crystal display device was evaluated in four grades as described below:

AA: No afterimage.
A: Afterimage was observed slightly but was at an acceptable level.
B: Afterimage was observed and was at an unacceptable level.
C: Afterimage was observed and was far from the acceptable level.

(Drop Marks)

Drop marks that appeared white when black was displayed in all parts of the screen were observed with naked eye and the drop marks of the liquid crystal display device were evaluated in four grades below:

AA: No afterimage.
A: Afterimage was observed slightly but was at an acceptable level.
B: Afterimage was observed and was at an unacceptable level.
C: Afterimage was observed and was far from the acceptable level.

In Examples, following abbreviations were used in describing compounds.

(Side Chain)

n represents —$C_nH_{2n+1}$ (linear alkyl group with n carbon atoms).

On represents —$OC_nH_{2n+1}$ (linear alkoxy group with n carbon atoms).

(Cyclic Structure)

[Chem. 19]

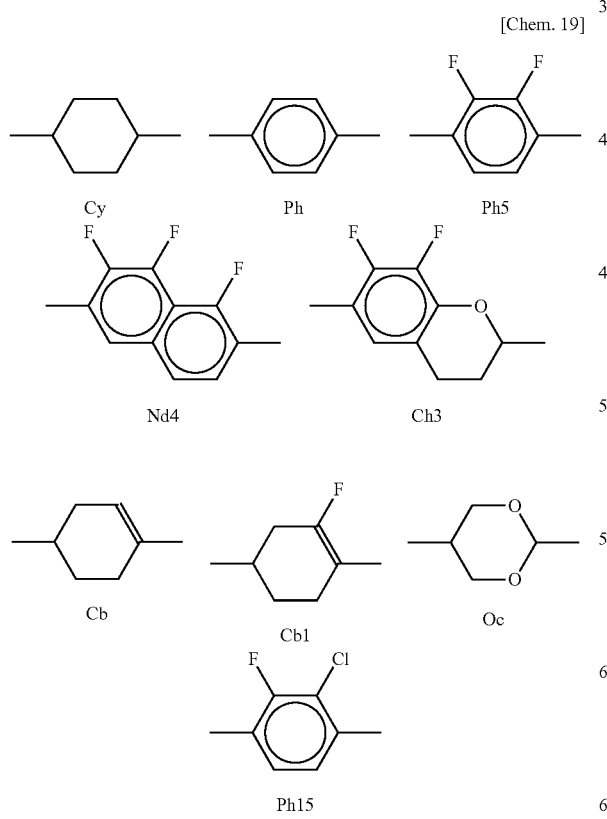

Example 1

A first substrate (common electrode substrate) that has a transparent electrode layer constituted by a transparent common electrode and a color filter layer and a second substrate (pixel electrode substrate) having a pixel electrode layer that includes transparent pixel electrodes driven by active elements were made.

A vertical alignment film material containing a polymerizable liquid crystal compound and a polymerization initiator was applied to each of the common electrode substrate and the pixel electrode substrate by a spin coating method to form a 200 nm-thick precursor layer of a vertical alignment film. UCL-011-K1 (DIC Corporation) was used as the vertical alignment film forming material.

Each substrate with a vertical alignment film forming material applied thereon was heated in a 70° C. thermostat for 15 minutes to transform the polymerizable liquid crystal compound in the applied vertical alignment film forming material into an isotropic liquid.

The temperature was then decreased to room temperature at a rate of 10° C./min so that the polymerizable liquid crystal compound aligned vertically.

A magnetic field slanted by 70° from the substrate surface was applied to each of the pixel electrode substrate and the common electrode substrate so as to provide a pretilt angle to the polymerizable liquid crystal compound. Under this state, ultraviolet light was applied to cure the polymerizable liquid crystal compound and form a vertical alignment film.

A liquid crystal composition containing compounds represented by chemical formulae below was sandwiched between the common electrode substrate and the pixel electrode substrate each having a vertical alignment film formed thereon. Then the sealing material was cured to form a liquid crystal composition layer. During this process, a spacer having a thickness of 4 μm was used to adjust the thickness of the liquid crystal composition layer to 4 μm.

In the chemical formulae shown below, compounds belonging to group (I) are compounds represented by general formula (I) above and compounds belonging to group (II) are compounds represented by general formula (II) above.

[Chem. 20]

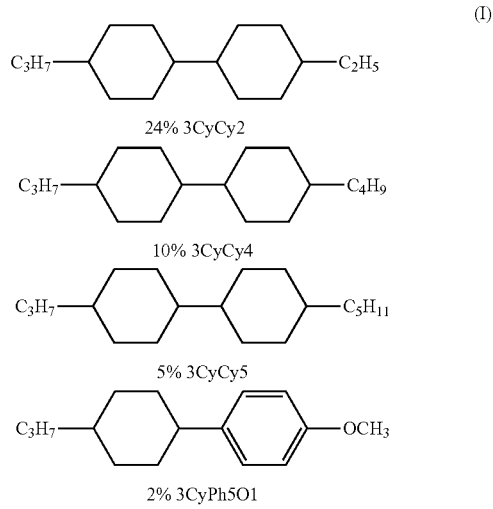

-continued

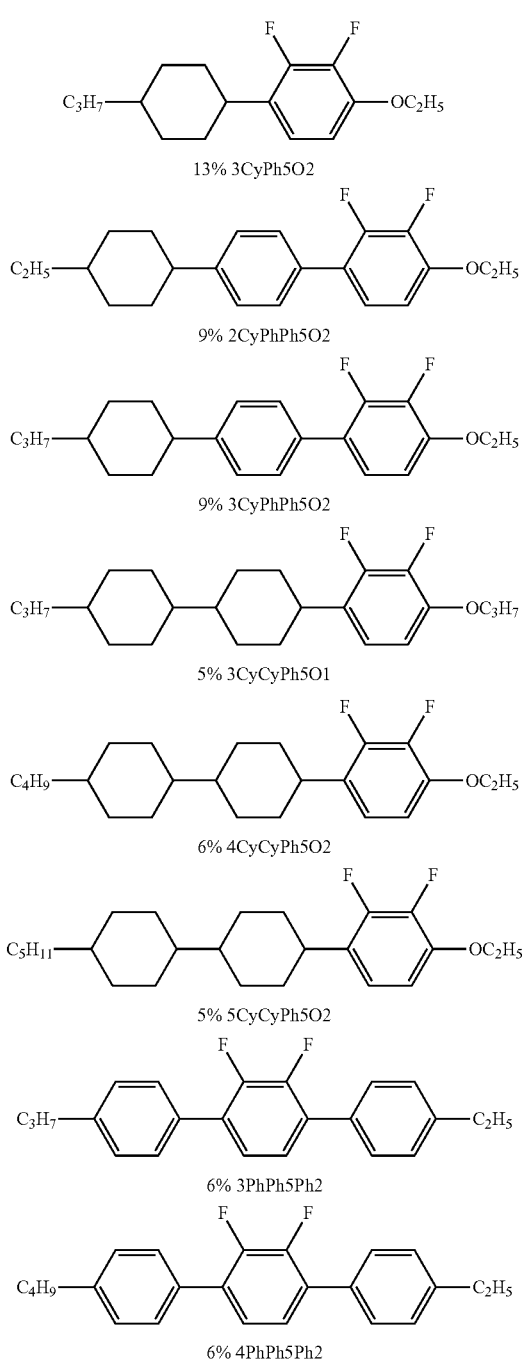

The liquid crystal display device obtained was irradiated with ultraviolet light while applying a square AC field to cure the polymerizable compound having a reactive group. UIS-S2511RZ produced by Ushio Inc., and a UV lamp USH-250BY produced by Ushio Inc., were used as the irradiators. The liquid crystal display device was irradiated with ultraviolet light at 20 mW for 10 minutes to obtain a liquid crystal display device of Example 1. As a result of this step, a vertical alignment film that contains a polymer of the polymerizable compound having a reactive group was formed and the liquid crystal molecules in the liquid crystal composition layer were provided with a pretilt angle.

Figure 3:
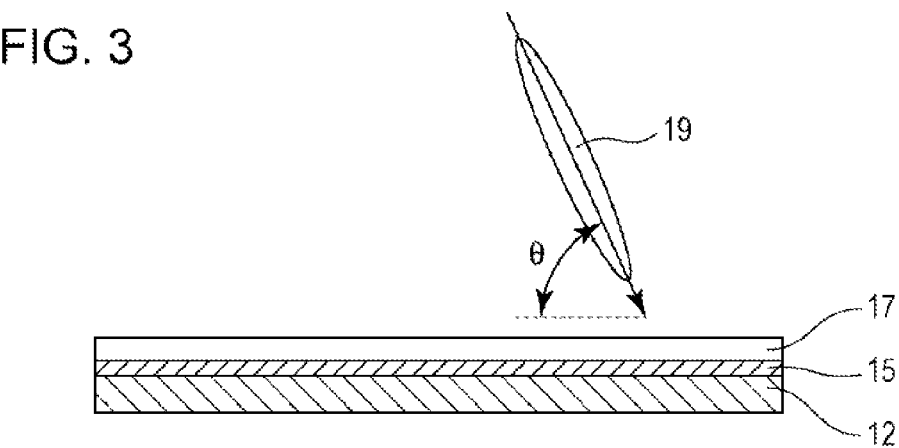
FIG. 3 is a diagram showing the definition of a pretilt angle in the liquid crystal display device according to the present invention.

The pretilt angle is defined as shown in FIG. 3. If the molecules are aligned perfectly vertically, the pretilt angle (θ) is 90°. When a pretilt angle is provided, the pretilt angle (θ) is smaller than 90°.

The liquid crystal display device of Example 1 has pretilt angles in four different directions in four domains, respectively, formed along the slits of the pixel electrode shown in FIG. 2. The pretilt angles were retained after curing of the polymerizable compound even when the AC field was turned off. The pretilt angle retained was 87°.

The liquid crystal display device of Example 1 obtained as such exhibited good response speed, suppressed drop marks, and exhibited good ghosting resistance as shown in Table 1.

TABLE 1

| | |
|---|---|
| $T_{NI}/°C$ | 81.0 |
| $\Delta n$ | 0.103 |
| $n_0$ | 1.483 |
| $\epsilon_{//}$ | 3.3 |
| $\epsilon_{\perp}$ | 6.2 |
| $\Delta\epsilon$ | -2.9 |
| $\eta/mPa \cdot s$ | 20.3 |
| $\gamma_1/mPa \cdot s$ | 112 |
| $\gamma_1/\Delta n^2 \times 10^{-2}$ | 104 |
| Drop mark evaluation | AA |
| Ghosting evaluation | AA |
| Response speed/ms | 8.4 |

Comparative Example 1

A liquid crystal composition containing compounds represented by chemical formulae below was prepared and a liquid crystal display device of Comparative Example 1 was obtained as in Example 1 except that this liquid crystal composition was used.

[Chem. 21]

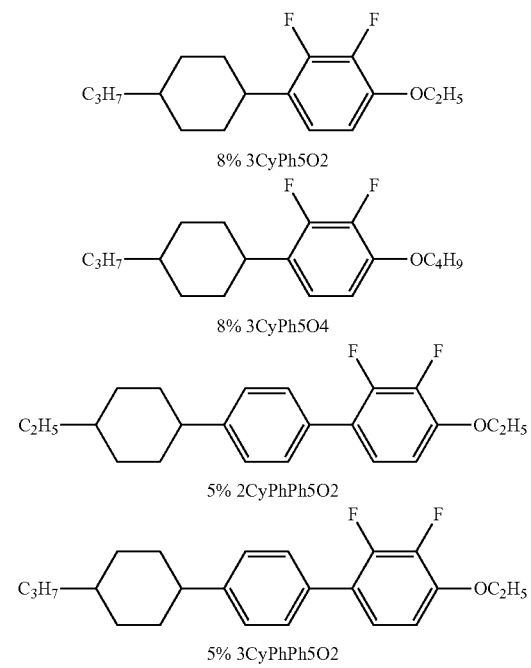

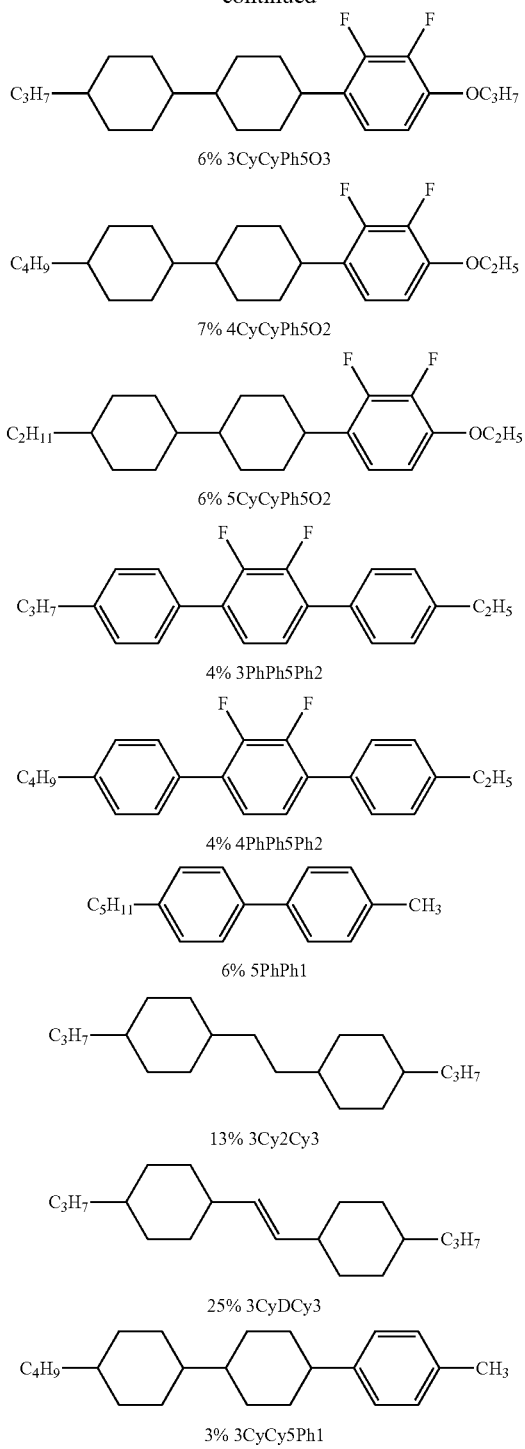

TABLE 2

| | |
|---|---|
| $T_{NI}/°C$ | 80.2 |
| $\Delta n$ | 0.104 |
| $n_o$ | 1.481 |
| $\epsilon_{//}$ | 3.1 |
| $\epsilon_{\perp}$ | 6.0 |
| $\Delta\epsilon$ | −3.0 |
| $\eta$/mPa·s | 19.6 |
| $\gamma_1$/mPa·s | 143 |
| $\gamma_1/\Delta n^2 \times 10^{-2}$ | 131 |
| Drop mark evaluation | C |
| Ghosting evaluation | C |
| Response speed/ms | 10.9 |

Comparative Example 2

A liquid crystal composition having a composition shown in Table 3 was prepared and a liquid crystal display device of Comparative Example 2 was obtained as in Example 1 except that this liquid crystal composition was used.

TABLE 3

| | |
|---|---|
| $T_{NI}/°C$ | 80.2 |
| $\Delta n$ | 0.103 |
| $n_o$ | 1.479 |
| $\epsilon_{//}$ | 3.1 |
| $\epsilon_{\perp}$ | 6.2 |
| $\Delta\epsilon$ | −3.0 |
| $\eta$/mPa·s | 18.5 |
| $\gamma_1$/mPa·s | 132 |
| $\gamma_1/\Delta n^2 \times 10^{-2}$ | 125 |
| 3CyPh5O2 | 9% |
| 3CyPh5O2 | 9% |
| 2CyPhPh5O2 | 4% |
| 3CyPhPh5O2 | 4% |
| 3CyCyPh5O3 | 7% |
| 4CyCyPh5O2 | 7% |
| 5CyCyPh5O2 | 7% |
| 3PhPh5O2 | 3% |
| 4PhPh5O2 | 3% |
| 5PhPh1 | 3% |
| 3Cy2Cy3 | 15% |
| 3CyDCy3 | 25% |
| 0d3PhTPh3d0 | 2% |
| 3CyPhTPh2 | 2% |
| Drop mark evaluation | B |
| Ghosting evaluation | C |
| Response speed/ms | 10.4 |

The liquid crystal display device of Comparative Example 1 was evaluated in terms of ghosting and drop marks as in Example 1. The results are shown in Table 2.

The results show that the liquid crystal composition prepared in Comparative Example 1 was inferior to the liquid crystal composition prepared in Example 1. The liquid crystal composition prepared in Comparative Example 1 exhibited a lower response speed than the liquid crystal composition prepared in Example 1.

The liquid crystal display device of Comparative Example 2 was evaluated in terms of ghosting and drop marks as in Example 1. The results are shown in Table 3.

The results show that the liquid crystal composition prepared in Comparative Example 2 was inferior to the liquid crystal composition prepared in Example 1. The liquid crystal composition prepared in Comparative Example 2 exhibited a lower response speed than the liquid crystal composition prepared in Example 1.

Comparative Example 3

A liquid crystal composition having a composition shown in Table 4 was prepared and a liquid crystal display device of Comparative Example 3 was obtained as in Example 1 except that this liquid crystal composition was used.

TABLE 4

| | |
|---|---|
| $T_{NI}/°C$ | 81.1 |
| $\Delta n$ | 0.104 |
| $n_o$ | 1.488 |

TABLE 4-continued

| | |
|---|---|
| $\epsilon_{//}$ | 3.7 |
| $\epsilon_{\perp}$ | 6.5 |
| $\Delta\epsilon$ | −2.9 |
| $\eta$/mPa · s | 26.6 |
| $\gamma_1$/mPa · s | 146 |
| $\gamma_1/\Delta n^2 \times 10^{-2}$ | 135 |
| 3CyCy2 | 24% |
| 3CyCy4 | 7% |
| 3CyPhO1 | 23% |
| 3PhPh5Ph2 | 5% |
| 4PhPh5Ph2 | 5% |
| 3Cy1ONd4O4 | 3% |
| 5Cy1ONd4O2 | 3% |
| 5Cy1ONd4O3 | 2% |
| 3Cy2Cy1ONd4O2 | 7% |
| 3Cy2Cy1ONd4O3 | 7% |
| 2CyCy1ONd4O2 | 7% |
| 3CyCy1ONd4O4 | 7% |
| Drop mark evaluation | C |
| Ghosting evaluation | C |
| Response speed/ms | 11.2 |

The liquid crystal display device of Comparative Example 3 was evaluated in terms of ghosting and drop marks as in Example 1. The results are shown in Table 4.

The results show that the liquid crystal composition prepared in Comparative Example 3 was inferior to the liquid crystal composition prepared in Example 1. The liquid crystal composition prepared in Comparative Example 3 exhibited a lower response speed than the liquid crystal composition prepared in Example 1.

Comparative Example 4

A liquid crystal composition having a composition shown in Table 5 was prepared and a liquid crystal display device of Comparative Example 4 was obtained as in Example 1 except that this liquid crystal composition was used.

TABLE 5

| | |
|---|---|
| $T_{NI}$/° C. | 79.9 |
| $\Delta n$ | 0.104 |
| $n_o$ | 1.486 |
| $\epsilon_{//}$ | 3.7 |
| $\epsilon_{\perp}$ | 6.5 |
| $\Delta\epsilon$ | −2.9 |
| $\eta$/mPa · s | 29.7 |
| $\gamma_1$/mPa · s | 144 |
| $\gamma_1/\Delta n^2 \times 10^{-2}$ | 132 |
| 3CyCy2 | 24% |
| 3CyCy4 | 2% |
| 3CyPhO1 | 19% |
| 3PhPh5Ph2 | 6% |
| 4PhPh5Ph2 | 6% |
| 3Cy1ONd4O4 | 3% |
| 5Cy1ONd4O2 | 3% |
| 5Cy1ONd4O3 | 2% |
| 3Cy2Cy1ONd4O2 | 4% |
| 3Cy2Cy1ONd4O3 | 4% |
| 2CyCy1ONd4O2 | 4% |
| 3CyCy1ONd4O4 | 4% |
| 3Cy2Ph5O4 | 2% |
| 4Cy2Ph5O2 | 2% |
| 3CyCy2Ph5O3 | 5% |
| 3CyCy2Ph5O4 | 5% |
| 3CyCy2Ph5O2 | 5% |
| Drop mark evaluation | B |
| Ghosting evaluation | C |
| Response speed/ms | 10.8 |

The liquid crystal display device of Comparative Example 4 was evaluated in terms of ghosting and drop marks as in Example 1. The results are shown in Table 5.

The results show that the liquid crystal composition prepared in Comparative Example 4 was inferior to the liquid crystal composition prepared in Example 1. The liquid crystal composition prepared in Comparative Example 4 exhibited a lower response speed than the liquid crystal composition prepared in Example 1.

Comparative Example 5

A liquid crystal composition having a composition shown in Table 6 was prepared and a liquid crystal display device of Comparative Example 5 was obtained as in Example 1 except that this liquid crystal composition was used.

TABLE 6

| | |
|---|---|
| $T_{NI}$/° C. | 80.2 |
| $\Delta n$ | 0.093 |
| $n_o$ | 1.484 |
| $\epsilon_{//}$ | 3.9 |
| $\epsilon_{\perp}$ | 7.7 |
| $\Delta\epsilon$ | −3.7 |
| $\eta$/mPa · s | 30.5 |
| $\gamma_1$/mPa · s | 153 |
| $\gamma_1/\Delta n^2 \times 10^{-2}$ | 175 |
| 3CyCy2 | 24% |
| 3CyCy4 | 6% |
| 3CyPhO1 | 25% |
| 3Cy1ONd4O4 | 5% |
| 5Cy1ONd4O2 | 5% |
| 5Cy1ONd4O3 | 5% |
| 3Cy2Cy1ONd4O2 | 8% |
| 3Cy2Cy1ONd4O3 | 8% |
| 2CyCy1ONd4O2 | 7% |
| 3CyCy1ONd4O4 | 7% |
| Drop mark evaluation | C |
| Ghosting evaluation | B |
| Response speed/ms | 13.9 |

The liquid crystal display device of Comparative Example 5 was evaluated in terms of ghosting and drop marks as in Example 1. The results are shown in Table 6.

The results show that the liquid crystal composition prepared in Comparative Example 5 was inferior to the liquid crystal composition prepared in Example 1. The liquid crystal composition prepared in Comparative Example 5 exhibited a lower response speed than the liquid crystal composition prepared in Example 1.

Comparative Example 6

A liquid crystal composition having a composition shown in Table 7 was prepared and a liquid crystal display device of Comparative Example 6 was obtained as in Example 1 except that this liquid crystal composition was used.

TABLE 7

| | |
|---|---|
| $T_{NI}$/° C. | 80.7 |
| $\Delta n$ | 0.089 |
| $n_o$ | 1.482 |
| $\epsilon_{//}$ | 3.7 |
| $\epsilon_{\perp}$ | 6.8 |
| $\Delta\epsilon$ | −3.1 |
| $\eta$/mPa · s | 29.9 |
| $\gamma_1$/mPa · s | 130 |
| $\gamma_1/\Delta n^2 \times 10^{-2}$ | 164 |
| 3CyCy2 | 24% |
| 3CyCy4 | 2% |
| 3CyPhO1 | 25% |
| 3Cy1ONd4O4 | 2% |
| 5Cy1ONd4O2 | 2% |
| 5Cy1ONd4O3 | 2% |

TABLE 7-continued

| | |
|---|---|
| 3Cy2Cy1ONd4O2 | 6% |
| 3Cy2Cy1ONd4O3 | 6% |
| 2CyCy1ONd4O2 | 6% |
| 3CyCy1ONd4O4 | 5% |
| 3Cy2Ph5O4 | 2% |
| 4Cy2Ph5O2 | 2% |
| 3CyCy2Ph5O3 | 5% |
| 3CyCy2Ph5O4 | 6% |
| 3CyCy2Ph5O2 | 5% |
| Drop mark evaluation | C |
| Ghosting evaluation | B |
| Response speed/ms | 13.5 |

The liquid crystal display device of Comparative Example 6 was evaluated in terms of ghosting and drop marks as in Example 1. The results are shown in Table 7.

The results show that the liquid crystal composition prepared in Comparative Example 6 was inferior to the liquid crystal composition prepared in Example 1. The liquid crystal composition prepared in Comparative Example 6 exhibited a lower response speed than the liquid crystal composition prepared in Example 1.

Example 2

A liquid crystal display device of Example 2 was obtained as in Example 1 except that a polyimide solution (trade name: JALS2131-R6, produced by JSR) containing 3% of a polyimide precursor and a solution containing 3% of a polymerizable compound having a reactive group represented by formula (V-2) below were used as the vertical alignment film forming material.

[Chem. 22]

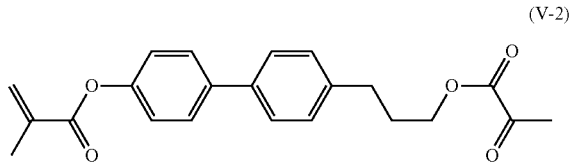

(V-2)

The liquid crystal display device of Example 2 was evaluated in terms of ghosting and drop marks as in Example 1. The results are shown in Table 8.

The results show that the liquid crystal display device of Example 2 was slightly inferior to the liquid crystal display device of Example 1 but exhibited high response speed, suppressed drop marks, and was resistant to ghosting.

TABLE 8

| | |
|---|---|
| Drop mark evaluation | AA |
| Ghosting evaluation | A |
| Response speed/ms | 8.7 |

Example 3

A liquid crystal display device of Example 3 was obtained as in Example 1 except that a polyimide solution (trade name: JALS2131-R6, produced by JSR) containing 3% of a polyimide precursor and a solution containing 3% of a polymerizable compound having a reactive group represented by formula (V-3) below were used as the vertical alignment film forming material.

[Chem. 23]

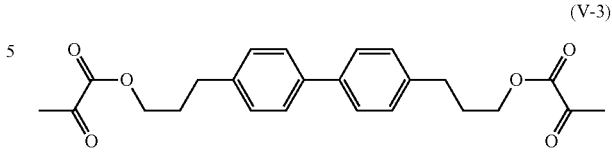

(V-3)

The liquid crystal display device of Example 3 was evaluated in terms of ghosting and drop marks as in Example 1. The results are shown in Table 9.

The results show that the liquid crystal display device of Example 3 was slightly inferior to the liquid crystal display device of Example 1 but exhibited high response speed, suppressed drop marks, and was resistant to ghosting.

TABLE 9

| | |
|---|---|
| Drop mark evaluation | A |
| Ghosting evaluation | AA |
| Response speed/ms | 8.8 |

Example 4

A liquid crystal display device of Example 4 was obtained as in Example 1 except that a liquid crystal composition having a composition shown in Table 10 was used as the liquid crystal composition.

TABLE 10

| | |
|---|---|
| $T_{NI}/°C.$ | 80.2 |
| $\Delta n$ | 0.105 |
| $n_0$ | 1.485 |
| $\epsilon_{//}$ | 3.2 |
| $\epsilon_{\perp}$ | 6.1 |
| $\Delta\epsilon$ | -2.9 |
| $\eta/mPa \cdot s$ | 22.7 |
| $\gamma_1/mPa \cdot s$ | 124 |
| $\gamma_1/\Delta n^2 \times 10^{-2}$ | 112 |
| 3CyCy2 | 20% |
| 3CyCy4 | 10% |
| 3CyPh5O2 | 7% |
| 3CyPh5O4 | 7% |
| 2CyPhPh5O2 | 6% |
| 3CyPhPh5O2 | 7% |
| 3CyCyPh5O3 | 7% |
| 4CyCyPh5O2 | 8% |
| 5CyCyPh5O2 | 7% |
| 3PhPh5Ph2 | 4% |
| 4PhPh5Ph2 | 4% |
| 5PhPh1 | 8% |
| 3CyCyPh1 | 5% |
| Drop mark evaluation | AA |
| Ghosting evaluation | A |
| Response speed/ms | 9.2 |

The liquid crystal display device of Example 4 was evaluated in terms of ghosting and drop marks as in Example 1. The results are shown in Table 10.

The results show that the liquid crystal display device of Example 4 was slightly inferior to the liquid crystal display device of Example 1 but exhibited relatively high response speed, suppressed drop marks, and was resistant to ghosting.

Example 5

A liquid crystal display device of Example 5 was obtained as in Example 1 except that a liquid crystal composition having a composition shown in Table 11 was used as the liquid crystal composition.

TABLE 11

| | |
|---|---|
| $T_{NI}/°C$ | 80.3 |
| $\Delta n$ | 0.106 |
| $n_0$ | 1.486 |
| $\epsilon_{//}$ | 3.3 |
| $\epsilon_\perp$ | 6.2 |
| $\Delta\epsilon$ | -2.9 |
| $\eta$/mPa·s | 21.4 |
| $\gamma_1$/mPa·s | 121 |
| $\gamma_1/\Delta n^2 \times 10^{-2}$ | 107 |
| 3CyCy2 | 23% |
| 3CyCy4 | 5% |
| 3CyPhO1 | 7% |
| 2CyPh5O2 | 8% |
| 3CyPh5O4 | 7% |
| 2CyPhPh5O2 | 7% |
| 3CyPhPh5O2 | 9% |
| 3CyCyPh5O3 | 5% |
| 4CyCyPh5O2 | 6% |
| 5CyCyPh5O2 | 5% |
| 3PhPh5Ph2 | 5% |
| 4PhPh5Ph2 | 6% |
| 3CyCyPh1 | 7% |
| Drop mark evaluation | AA |
| Ghosting evaluation | A |
| Response speed/ms | 8.8 |

The liquid crystal display device of Example 5 was evaluated in terms of ghosting and drop marks as in Example 1. The results are shown in Table 11.

The results show that the liquid crystal display device of Example 5 was slightly inferior to the liquid crystal display device of Example 1 but exhibited relatively high response speed, suppressed drop marks, and was resistant to ghosting.

Example 6

A liquid crystal display device of Example 6 was obtained as in Example 1 except that a liquid crystal composition having a composition shown in Table 12 was used as the liquid crystal composition.

TABLE 12

| | |
|---|---|
| $T_{NI}/°C$ | 81.3 |
| $\Delta n$ | 0.106 |
| $n_0$ | 1.483 |
| $\epsilon_{//}$ | 3.2 |
| $\epsilon_\perp$ | 6.0 |
| $\Delta\epsilon$ | -2.8 |
| $\eta$/mPa·s | 20.7 |
| $\gamma_1$/mPa·s | 117 |
| $\gamma_1/\Delta n^2 \times 10^{-2}$ | 105 |
| 3CyCy2 | 21% |
| 3CyCy4 | 12% |
| 3CyCy5 | 5% |
| 2CyPh5O2 | 7% |
| 3CyPh5O4 | 8% |
| 2CyPhPh5O2 | 7% |
| 3CyPhPh5O2 | 7% |
| 3CyCyPh5O3 | 5% |
| 4CyCyPh5O2 | 5% |
| 5CyCyPh5O2 | 5% |
| 3PhPh5Ph2 | 7% |
| 4PhPh5Ph2 | 8% |
| 3CyCyPh1 | 3% |
| Drop mark evaluation | A |
| Ghosting evaluation | AA |
| Response speed/ms | 9.1 |

The liquid crystal display device of Example 6 was evaluated in terms of ghosting and drop marks as in Example 1. The results are shown in Table 12.

The results show that the liquid crystal display device of Example 5 was slightly inferior to the liquid crystal display device of Example 1 but exhibited relatively high response speed, suppressed drop marks, and was resistant to ghosting.

Example 7

A liquid crystal display device of Example 7 was obtained as in Example 1 except that a liquid crystal composition having a composition shown in Table 13 was used as the liquid crystal composition.

TABLE 13

| | |
|---|---|
| $T_{NI}/°C$ | 82.7 |
| $\Delta n$ | 0.107 |
| $n_0$ | 1.486 |
| $\epsilon_{//}$ | 3.3 |
| $\epsilon_\perp$ | 6.3 |
| $\Delta\epsilon$ | -3.0 |
| $\eta$/mPa·s | 24.2 |
| $\gamma_1$/mPa·s | 141 |
| $\gamma_1/\Delta n^2 \times 10^{-2}$ | 123 |
| 3CyCy2 | 24% |
| 3CyCy4 | 5% |
| 3CyPhO1 | 6% |
| 2CyPh5O2 | 5% |
| 3CyPh5O4 | 5% |
| 2CyPhPh5O2 | 7% |
| 3CyPhPh5O2 | 9% |
| 3CyCyPh5O3 | 8% |
| 4CyCyPh5O2 | 9% |
| 5CyCyPh5O2 | 8% |
| 3PhPh5Ph2 | 5% |
| 4PhPh5Ph2 | 5% |
| 5PhPh1 | 4% |
| Drop mark evaluation | A |
| Ghosting evaluation | AA |
| Response speed/ms | 10.1 |

The liquid crystal display device of Example 7 was evaluated in terms of ghosting and drop marks as in Example 1. The results are shown in Table 13.

The results show that the liquid crystal display device of Example 7 was slightly inferior to the liquid crystal display device of Example 1 but exhibited relatively high response speed, suppressed drop marks, and was resistant to ghosting.

REFERENCE SIGNS LIST

10 liquid crystal display device, 11 first substrate, 12 second substrate, 13 liquid crystal composition layer, 14 common electrode, 15 pixel electrode, 16 vertical alignment film, 17 vertical alignment film, 18 color filter, 19 liquid crystal molecule

The invention claimed is:

1. A liquid crystal display device comprising:
   a first substrate,
   a second substrate,
   a liquid crystal composition layer sandwiched between the first substrate and the second substrate,
   an electrode that is disposed on at least one of the first substrate and the second substrate and controls liquid crystal molecules in the liquid crystal composition layer, and
   a vertical alignment film that is disposed on at least one of the first substrate and the second substrate and controls an alignment direction of liquid crystal molecules in the liquid crystal composition layer so that the alignment direction is substantially vertical to a surface of the first substrate and a surface of the second substrate that are adjacent to the liquid crystal composition layer,
   wherein the vertical alignment film is formed of a cured product of a polymerizable liquid crystal compound, in which an alignment direction of the polymerizable liquid crystal compound at a surface adjacent to the liquid crystal composition layer is substantially vertical to the surface of the first substrate and the surface of the second substrate that are adjacent to the liquid crystal composition layer, and wherein a liquid crystal composition constituting the liquid crystal composition layer contains a compound represented by general formula (I)

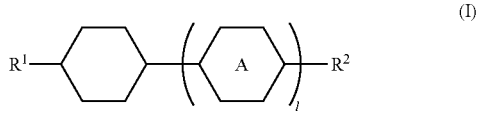
(I)

(In the formula, $R^1$ and $R^2$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; A represents a 1,4-phenylene group or a trans-1,4-cyclohexylene group; l represents 1 or 2; and when l is 2, the two A may be the same or different from each other) and a compound represented by general formula (II)

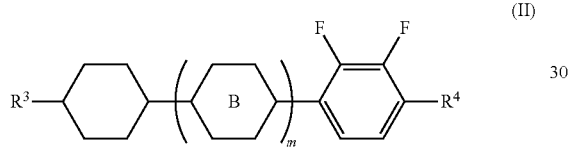
(II)

(In the formula, $R^3$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $R^4$ represents an alkyl group having 1 to 8 carbon atoms, an alkenyl group having 4 to 8 carbon atoms, an alkoxy group having 1 to 8 carbon atoms, or an alkenyloxy group having 3 to 8 carbon atoms; B represents a 1,4-phenylene group or a trans-1,4-cyclohexylene group; m represents 0, 1, or 2; and when m is 2, the two B may be the same or different from each other).

2. The liquid crystal display device according to claim 1, comprising a plurality of pixels each including two or more domains with pretilt angles different from one another.

3. The liquid crystal display device according to claim 1, wherein the vertical alignment film is in homeotropic alignment or hybrid alignment.

4. The liquid crystal display device according to claim 1, wherein the first substrate has a common electrode and the second substrate has a pixel electrode driven by a thin film transistor.

5. The liquid crystal display device according to claim 4, wherein the pixel electrode has comb-tooth slits that extend in four directions from the center of the pixel so as to form four domains in which the liquid crystal molecules in the liquid crystal composition layer align in different directions.

6. The liquid crystal display device according to claim 1, wherein the liquid crystal composition layer is formed by a dropping method.

7. The liquid crystal display device according to claim 1, wherein the liquid crystal composition contains 30 to 50 mass % of the compound represented by general formula (I) and 30 to 50 mass % of the compound represented by general formula (II).

8. The liquid crystal display device according to claim 1, wherein the polymerizable compound contains a polymerizable compound represented by general formula (V)

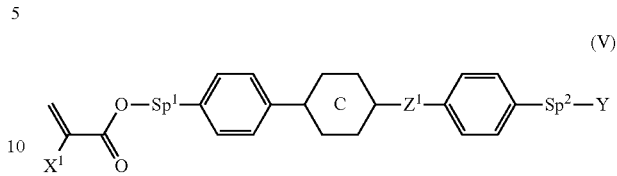
(V)

(In the formula, $X^1$ represents a hydrogen atom or a methyl group; $Sp^1$ and $Sp^2$ each independently represent a single bond, an alkylene group having 1 to 8 carbon atoms, or —O—$(CH_2)_s$— (in the formula, s represents an integer of 2 to 7 and the oxygen atom is to bond with an aromatic ring); $Z^1$ represents —$OCH_2$—, —$CH_2O$—, —COO—, —OCO—, —$CF_2O$—, —$OCF_2$—, —$CH_2CH_2$—, —$CF_2CF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—OCO—, —$CH_2CH_2$—OCO—, —COO—$CH_2$—, —OCO—$CH_2$—, —$CH_2$—COO—, —$CH_2$—OCO—, —$CY^1$=$CY^2$—, —C≡C—, or a single bond; Y represents an alkyl group having 1 to 8 carbon atoms, an alkenyl group having 2 to 8 carbon atoms, an alkoxy group having 1 to 8 carbon atoms, an alkenyloxy group having 2 to 8 carbon atoms, a hydrogen atom, a fluorine atom, a cyano group, or a structure below

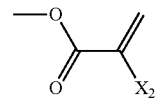

(In the formula, $X^2$ represents a hydrogen atom or a methyl group); C represents a 1,4-phenylene group, a trans-1,4-cyclohexylene group, or a single bond; D represents a 1,4-phenylene group or a trans-1,4-cyclohexylene group; and in C or D, any hydrogen atom in the 1,4-phenylene group may be substituted with a fluorine atom).

9. The liquid crystal display device according to claim 1, wherein the liquid crystal composition further contains 5 to 20 mass % of a compound represented by general formula (III)

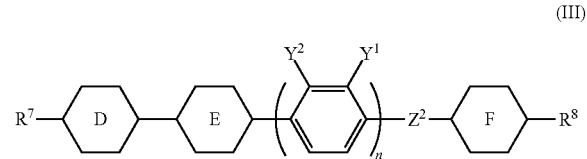
(III)

(In the formula, $R^7$ and $R^8$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms; $Y^1$ and $Y^2$ each independently represent a hydrogen atom or a fluorine atom; D, E, and F each independently represent a 1,4-phenylene group or trans- 1,4-cyclohexylene; $Z^2$ represents a single bond, —OCH$_2$—, —OCO—, —CH$_2$O—, or —OCO—; and n represents 0 or 1).

* * * * *